United States Patent [19]
Grisley

[11] Patent Number: 5,123,463
[45] Date of Patent: Jun. 23, 1992

[54] MORTISE AND TENON JIG FOR A ROUTER

[76] Inventor: Kenneth M. Grisley, P.O. Box 4646, Quesnel, B.C., Canada, V2J 3J8

[21] Appl. No.: 690,423

[22] Filed: Apr. 24, 1991

[51] Int. Cl.⁵ .............................................. B27M 3/00
[52] U.S. Cl. ...................................... 144/83; 144/84; 144/144 R; 144/144.5 GT; 144/134 D; 144/37; 144/372; 409/130
[58] Field of Search ................. 144/82, 83, 84, 134 D, 144/136 C, 144 R, 144 A, 372, 371; 409/125, 130, 182

[56] References Cited

U.S. PATENT DOCUMENTS 4,995,435 2/1997 Godfrey ......................... 144/144 R Primary Examiner—W. Donald Bray
Attorney, Agent, or Firm—Townsend and Townsend

[57] ABSTRACT

A jig for guiding a power tool having a cutter bit to cut joint members in workpieces includes a base frame having a tool support surface and a workpiece support surface. A pair of guide arms are releasably attachable to the power tool. A track is formed on the tool support surface adapted to slidably receive one of the guide arms. A template is releasably securable to the tool support surface having guide surfaces engagable by the other of the guide arms. The track and template cooperate to guide movement of the power tool atop the tool support surface. A clamping system is provided for securing workpieces to the workpiece support surface in a position to be cut by the power tool slidably supported on the tool support surface and guided by the track and the template to provide a joint member in one workpiece and a complementary joint member in another workpiece.

24 Claims, 4 Drawing Sheets

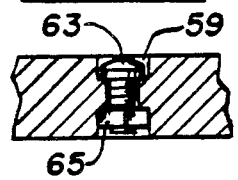
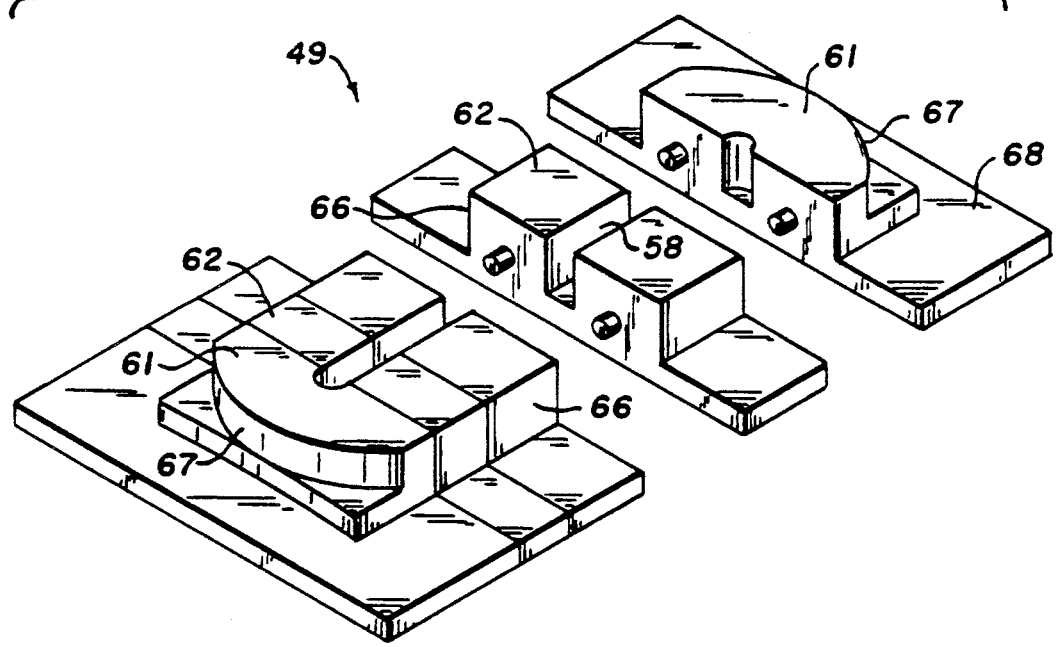

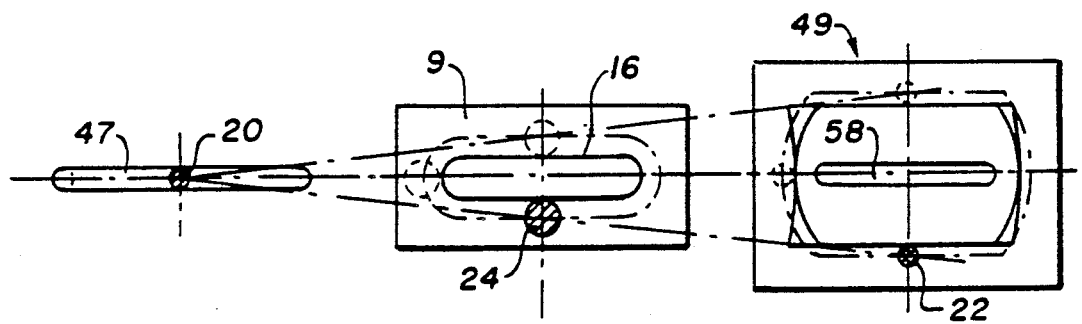
Fig. 3.
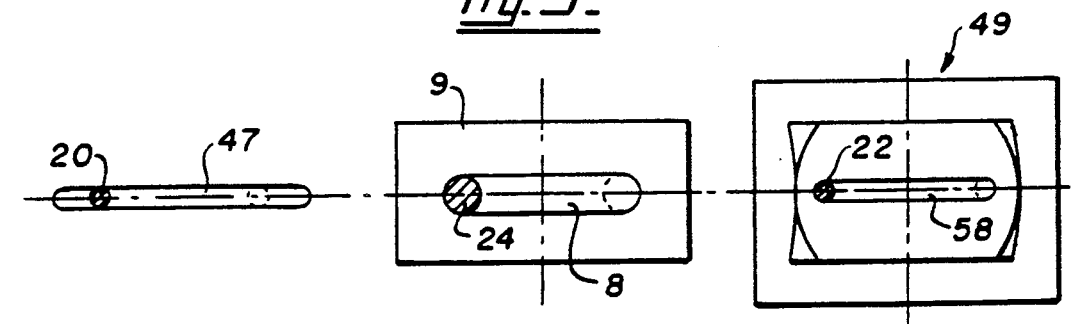
Fig. 4.
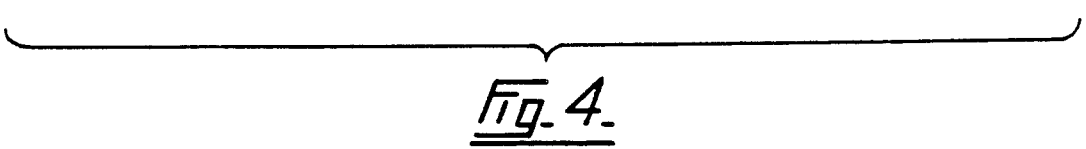
Fig. 5.
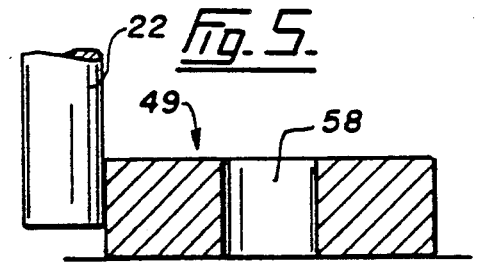
Fig. 6.
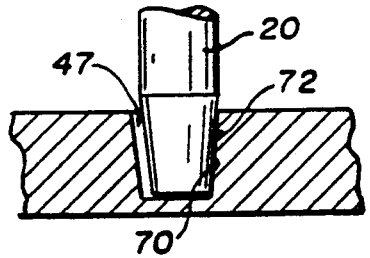
Fig. 7.
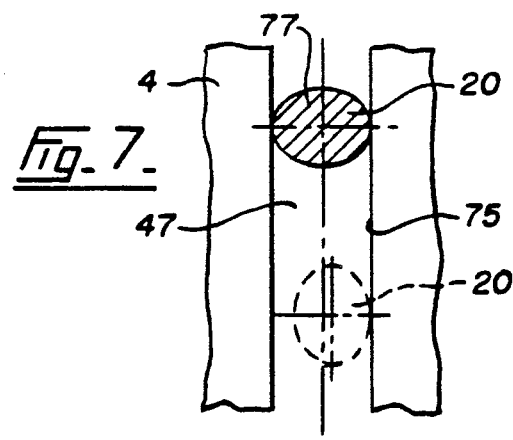

MORTISE AND TENON JIG FOR A ROUTER

FIELD OF THE INVENTION

This invention relates to a jig for supporting and guiding a power tool used to cut complementary joint members in workpieces, and is particularly suited for forming mortise and tenon joints using a hand held router.

BACKGROUND OF THE INVENTION

In the past mortise and tenon joint members have been cut using a variety of methods and devices.

Mortises have been cut using plunge type routers controlled by numerous guiding systems, including standard router fence guides, router template guide bushes, and fences for router bases. Anything that provides a straight edge, or guide, or edges on which the router bush, base edge or fence guide can run is suitable. Groves U.S. Pat. No. 4,197,887 and Hounshell U.S. Pat. No. 4,763,707 disclose a router base arrangement having two projecting pins, one either side of the router cutter, to allow for automatic centering of a mortise to be cut in a workpiece.

In the case of tenons, applicant's Peterson U.S. Pat. No(s). 4,428,408 and 4,479,523 both disclose jigs that permit two step routing of tenons. Peterson requires turning the jig template on the workpiece while applicant's patent requires turning the workpiece and template. Applicant's previous patent allows for easy routing of square cornered tenons having the thickness of the workpiece but the matching mortises must be hand squared.

As far as applicant is aware, a method or apparatus which allows for single pass routing of radiused tenons and corresponding radiused mortises using only a hand held portable router has not yet been developed. At present, the only way radiused cornered tenons can be made on one pass is with a stylus guided copy router type machine where the router is carried on an XY axis and guided by a separate pin or roller around a fixed tenon shape. These involve considerably higher cost machines such as those disclosed in Wirth U.S. Pat. No. 4,593,735 and Ducate U.S. Pat. No. 4,749,013.

SUMMARY OF THE INVENTION

Accordingly, there exists a need for a woodworking jig that addresses the shortcomings of the prior art. The present invention provides a router jig that will allow cutting of matching mortises and tenons in workpieces with the tenon cut in a single pass.

The present invention provides a jig for guiding a power tool having a cutter bit to cut joint members in workpieces, comprising:

a base frame having a tool support surface and a workpiece support surface;

a pair of guide members releasably attachable to said power tool;

track means formed on said tool support surface adapted to slidably receive one of said guide members;

template means releasably securable to said tool support surface having guide surfaces engagable by the other of said guide members, said track means and said template means co-operating to guide movement of said power tool atop said tool support surface; and clamping means for securing workpieces to the workpiece support surface in a position to be cut by said power tool slidably supported on said tool support surface and guided by said track means and said template means to cut a joint member in one workpiece and a complementary joint member in another workpiece.

The jig of the present invention is a simple and relatively low cost router accessory that is particularly suited for forming mortise and tenon joints. In addition, the jig is capable of easy adjustment to vary the dimensions of the joint parts to be cut and also to vary the tightness of fit between interconnectable joint parts.

BRIEF DESCRIPTION OF THE DRAWINGS

Aspects of the present invention are illustrated, merely by way of example, in the accompanying drawings in which:

FIG. 2a is a section view taken along line 2a—2a of FIG. 2 showing the adjustable stops incorporated into the tool supporting surface;

FIG. 2b is an exploded view showing a modular template means for use with the jig of the present invention;

FIG. 3 is a schematic plan view showing the positioning of the router cutter, the guide arms and the template means as a tenon is cut;

FIG. 4 is a schematic plan view showing the positioning of the router cutter, the guide arms and the template means as a mortise is cut;

FIG. 5 is a sectioned elevation view through the template means showing the engagement of a guiding pin with the side edge of the template means;

FIG. 6 is a sectioned elevation view showing a tapered guide pin in a tapered guide slot that allows for variation in the size of the mortises and tenons; and FIG. 7 is a plan view showing an alternative elliptical pin arrangement that allows for variation in the size of the mortises and tenons formed by the jig of the present invention.

DESCRIPTION OF THE PREFERRED EMBODIMENTS

Figure 1:
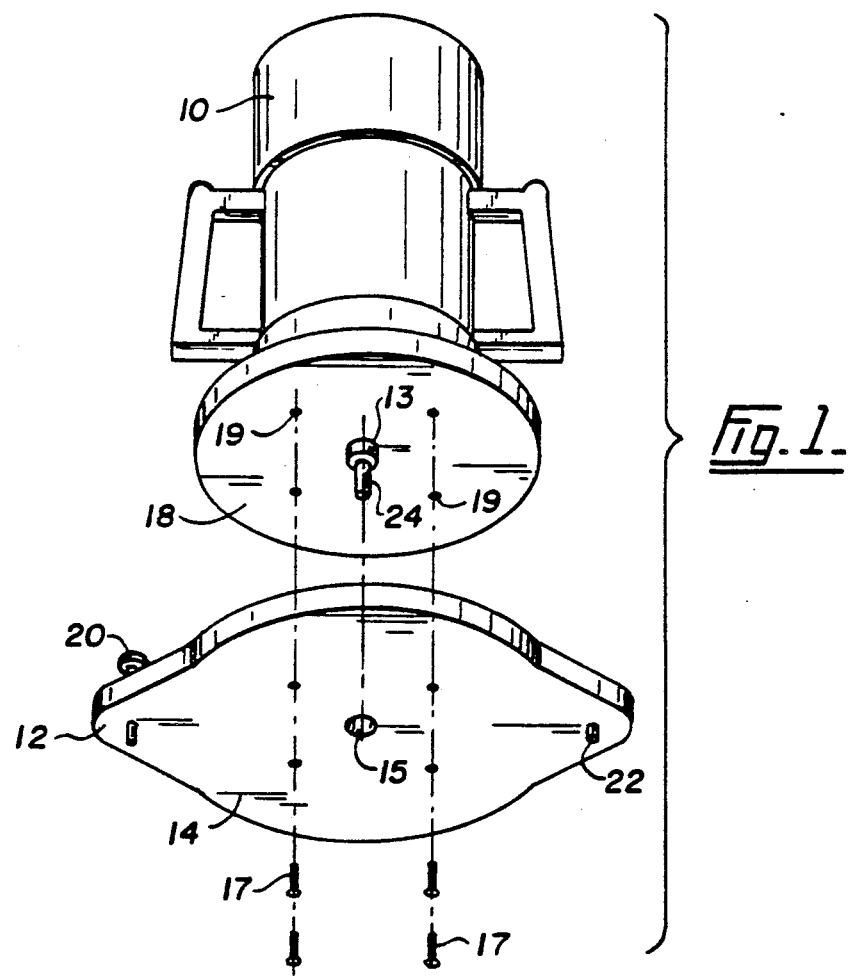
FIG. 1 is a perspective view showing a conventional router with a guide arm attachment according to the present invention.
Figure 1A:
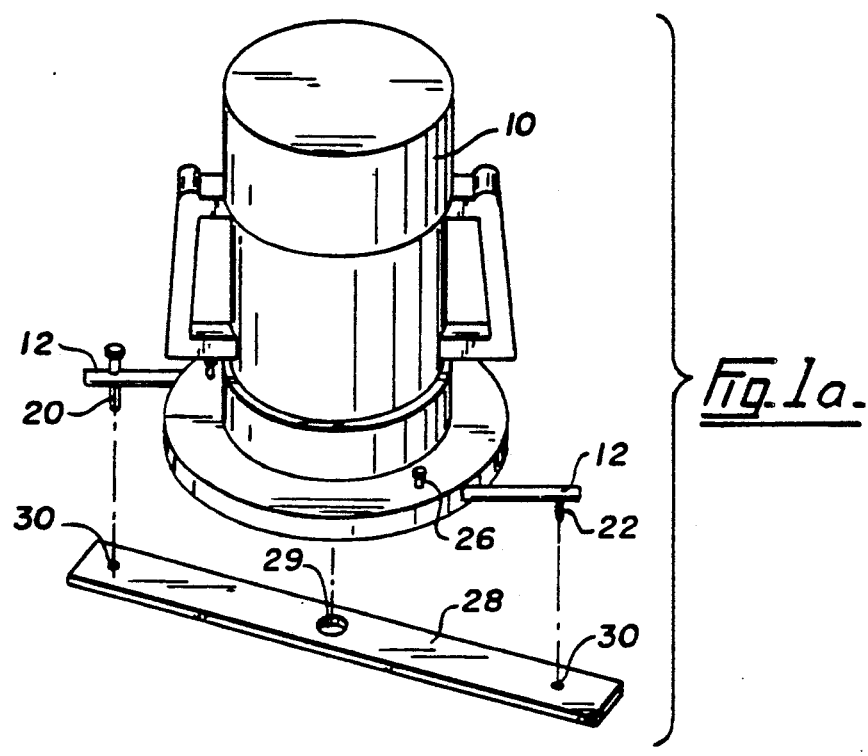
FIG. 1a is a perspective view of an alternative guide arms arrangement employing independent guide arms that are aligned using an alignment guide.
Figure 2:
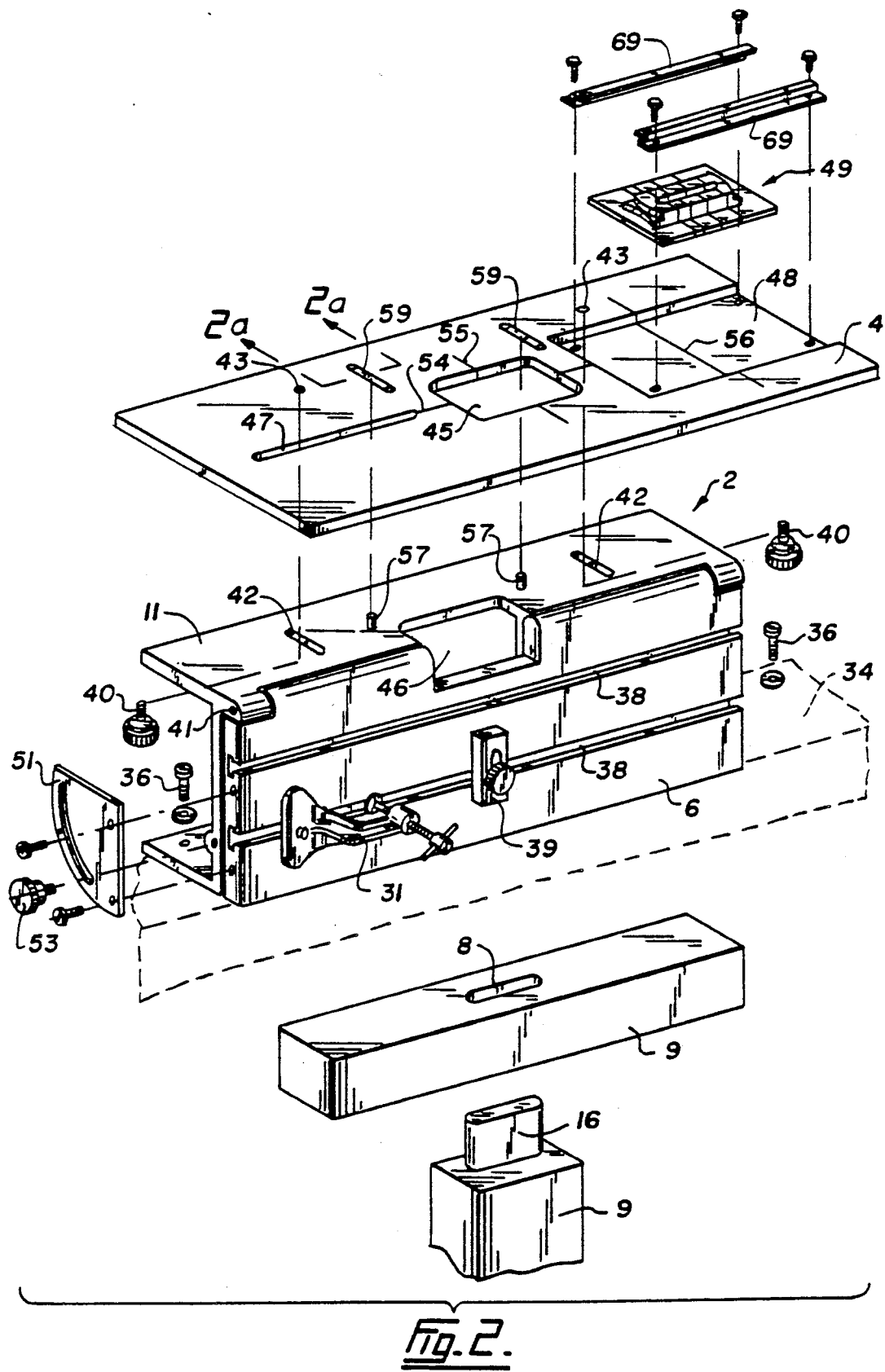
FIG. 2 is an exploded view showing the base frame of the present invention.

Referring to FIGS. 1, 1a and 2, there is shown a preferred embodiment of a jig according to the present invention. As shown in FIG. 2, the jig comprises a base frame 2 having a power tool support surface 4 and a workpiece support surface 6. Workpiece support surface 6 is used to clamp and hold a workpiece in order to form a woodworking joint member in the workpiece. The jig of the present invention is particularly suited for forming a mortise 8 or a tenon 16 in a workpiece 9 using a power tool, such as a conventional plunge router 10, that is supported and guided on tool support surface 4.

In order to work with the jig of the present invention, it is necessary that router 10 be fitted with guide members comprising guide arms 12 that are releasably attachable to the tool. Each guide arm is provided with a single depending pin 20 or 22. Referring to FIG. 1, there is shown a preferred embodiment in which guide arms 12 comprises extensions formed on opposite sides of an auxiliary base plate 14 adapted to be attached to the base of a router 10. Auxiliary base plate 14 is formed with a central hole 15 that will fit over a standard sized router guide bush 13, thereby automatically centering the base plate 14. The base plate can be fixed to router 10 either by adhesive, two sided sticky tape (not shown) or by screws 17 to the router's own sole plate 18 through fixing screw holes 19.

Pins 20 and 22 in arms 12 of the auxiliary base plate are aligned along an axis that also includes the straight cutter bit 24 of router 10. Preferably, pins 20 and 22 are equidistant from the centre of the router.

FIG. 1A illustrates an alternative guide arm arrangement in which guide arms 12 are independent extension members that attach directly the router base by way of fence holes that are conventionally formed in the router base. In the illustrated embodiment, arms 12 are located in place by threaded fasteners 26 that extend through the router base and intersect the inner ends of the arms. Other attachment arrangements are also possible. Pins 20 and 22 are also provided in the outer ends of the arms. To ensure alignment of the pins along an axis of the router base, a guide member aligning template 28 is provided with a central hole 29 to accept router bush 13 or the cutter of the router and a pair of outer holes 30 to accept pins 20 and 22.

As best shown in FIG. 2, the jig of the present invention is adapted to accommodate the conventional router with its attached guide arms. In the illustrated embodiment, workpiece supporting surface 6 is attached to an essentially U-shaped member 11 that can be suitably attached either permanently or temporarily to a solid mounting surface. For example, threaded fasteners 36 are used to anchor the workpiece supporting member to workbench 34 with a slight overhang. In the illustrated embodiment, slots 38 are formed in workpiece supporting surface 6 to slidably receive clamping means 31 for securing workpieces to the support surface 6 in a position to be cut by router 10. Only one clamping unit is illustrated in FIG. 2, however, normally two or more such clamps would be used to firmly locate a workpiece to the jig of the present application. Workpiece 9 can be clamped to supporting surface 6 at any desired angle or orientation to cut a complementary joint members. In this regard, workpiece support surface 6 is provided with a projecting positioning member 39 engagable with an edge of a workpiece for alignment of the workpiece. Projecting positioning member 39 is pivotable to allow for angled positioning of a workpiece and is preferably mounted by way of slots 38. In addition, workpiece support surface 6 is pivotally attached to base frame 2 by hinges 41. A quadrant 51 and locking knob 53 are attached between the base frame and the workpiece support surface 6 to allow for positioning of the surface at any desired angle. This arrangement allow for quick and efficient forming of angled or compound angled tenons.

Mounted over and adjacent workpiece support surface 6, there is an essentially horizontal tool support surface 4. Tool support surface 4 is slidably secured atop the workpiece support surface by threaded fasteners 40 that extend through slots 42 and engage threaded apertures 43 in the tool support surface. This arrangement allows for laterally slidable adjustment of tool support surface 4 atop workpiece support surface 6. In addition, base frame 2 is provided with upwardly extending pins 57 adapted to engage in slots 59 formed in tool support surface 4. As best shown in FIG. 2a, each slot includes a narrowed central portion adapted to receive and retain an adjustable stop in the form of a captive nut and bolt assembly 63. Nut 65 is prevented from rotating by the side walls of the slot and acts as an adjustable stop to limit movement of the tool support surface with respect to the workpiece support surface by engaging with pin 57. This allows the operator to adjust tool support surface 4 to move between two positions a set distance apart as limited by the stops. In this manner, the jig of the present invention can be set up to form double mortises and tenons a set distance apart by moving the tool support surface from one stop to the other after positioning of the stops at the appropriate spacing. It will be understood that a similar stop arrangement can be used to form multiple mortises and tenons a set distance apart.

Tool support surface 4 is formed with a cut out section 45 that overlays a cut out section 46 formed in workpiece support surface 6 and in U-shaped member 11. These cut out sections allow the router cutter to project through to a clamped workpiece when the router is supported and guided on surface 4. The router cutter guide bush 3 only projects into opening 45.

Track means in the form of slot 47 are formed on tool support surface 4. Slot 47 runs parallel to the plane of the workpiece support surface 6 and extends from adjacent the edge of surface 4 toward cutout section 45. The opposite end of surface 4 is formed with an inset region 48 to accept template means that assist in guiding the movement of the power tool atop the tool support surface in order to cut the desired joint member in a clamped workpiece.

To assist in setting up the jig of the present invention with regard to accurate position of the workpiece and the router, a series of guide lines are provided on the tool support surface. There is a centre line 54 that runs along the longitudinal axis of the tool support surface 4. A second orthogonal guide line 55 runs transversely across support surface 4 in the region of central cut out 45. A third guide line 56 runs parallel to line 55 through the inset region 48 of the surface. Preferably, lines 55 and 56 are spaced apart by a distance that is half the distance between pins 20 and 22 of the guide arms.

In the illustrated embodiment, the template means comprises a member 49 having an external guide surface shaped for cutting a tenon in a single pass of the router. Member 49 also includes an internal guide surface shaped for cutting a complementary mortise. As best shown in FIG. 2b, template member 49 is an essentially ellipsoid member having parallel, straight side edges 66 interconnecting a pair of rounded end portions 67 to define a template having an external guide surface to guide the movement of the tool to cut a radiused tenon in a workpiece. Mounting flanges 68 are also provided to allow the template to be seated within inset region 48. Elongate clips 69 anchor the mounting flange edges within region 48 to firmly attach guide template 49 to the tool support surface. Template member 49 is mounted to tool support surface 4 within inset region 48 in order that support surface 4, including the top of template member 49, presents a level surface over which the router is free to move.

Other shapes of guide template 49 are possible depending on the shape of the joint member to be cut. For example, template member 49 can be an essentially rectangular member to define a template that creates a rectangular tenon. In fact, the template member illustrated in the various FIGS. shows a dual template having a lower template region adjacent the mounting flange to form a rectangular tenon and an upper template region to form a radiused tenon. The operator runs the guide pin about the appropriate template region depending on the shape of the desired tenon. Note that the lower template region for forming a rectangular tenon has slightly concave and convex end portions in order to generate flat and square end edges on the tenon as the router is guided by the jig of the present invention.

Template member 49 when viewed in plan is a "projected" shape that guides cutter bit 24 at the workpiece to follow a cut that creates a desired joint member. In the illustrated embodiment, template member 49 is shaped to cut a radiused tenon and a corresponding mortise. The template is an essentially ellipsoid member having an asymmetrical shape that is selected such that a symmetrical radiused tenon is created at the workpiece when guide arm 12 is moved about the exterior surface of the template in the jig of the present invention.

Preferably, as illustrated in FIG. 2b, template member 49 is of modular construction and comprises two rounded end pieces 61 joined by one or more intermediate aligned central pieces 62 having parallel side edges. The end pieces define the rounded ends of the tenon to be cut and the one or more central pieces define the length of the straight sides of the tenon to be cut. The end pieces and the central pieces are releasably interconnectable, for example, by using a system of pegs and holes. Different pieces can be joined together as desired to allow cutting of a tenon of desired dimensions. The width of the joint members is varied by using wider end and central pieces. Alternatively, varying the diameter of the cutter bit will also allow for variation in the joint member dimensions. The modular pieces are also provided with a central oblong cavity 58 defining an internal guide surface to guide cutting of a mortise complementary to the tenon formed by the exterior guide surface.

When a power tool with attached guide arms is placed onto tool support surface 4, pin 20 engages in slot 47 and pin 22 is engaged against template member 49 by the user as shown in FIG. 5. As the power tool is moved by a user atop tool support surface 4, slot 47 and template member 49 co-operate to guide movement of the power tool to cut an appropriate joint member in a workpiece.

FIG. 3 schematically shows the arrangement of the various elements to cut a tenon with the power tool on support surface 4 and a workpiece 9 clamped substantially vertically to support surface 6. Pin 20 of a guide arm 12 is free to slide within slot 47. At the opposite end, pin 22 is guided about template member 49 by a user. In the centre, the router cutter 24 cuts workpiece 9 in a manner dictated by the shape of template 49. In FIG. 3, a series of positions of pins 20 and 22 and the corresponding positions of cutter 24 are illustrated by dash lines.

In a similar manner, FIG. 4 shows the arrangement of the various elements when cutting a mortise. Pin 20 of guide arm 12 is free to slide within slot 47. At the opposite end, pin 22 is guided within oblong cavity 58 by a user. In the centre, router cutter 24 cuts a mortise in workpiece 9 according to the shape dictated by oblong cavity 58.

The present invention also includes means for adjusting the interfit of complementary joint members. FIGS. 6 and 7 illustrate features of the jig of the present invention that permit small adjustments in the dimensions of the mortise and tenon members that affect the tightness of fit of the joints. Theoretically, using pin 20 of a set dimension running in slot 47 of a set dimension and pin 22 of a set dimension moved about template member 49 to guide a specific cutter bit will result in mortise and tenon members that interfit with appropriate tightness. However, factors such as cutter bits that vary in size, router run out and different types of workpiece wood have been found to affect the tightness of joint members cut using the apparatus of the present invention. Accordingly, it is desirable that the jig of the present invention have some means for adjusting the tightness of fit between joint members.

FIG. 6 shows a first means for adjusting interfit in which pin 20 is formed with bevelled sides 70 engagable in slot 47 that has correspondingly bevelled interior sides 72. Pin 20 has a threaded stem that is received in a correspondingly threaded hole in a guide arm. Pin 20 is also formed with a upper knob to allow for easy manual adjustment of the vertical position of pin 20. By raising and lowering pin 20 on sides 72 to a selected height and tracing a path along slot 47 at a constant level, it is possible to vary the dimensions of the tenon giving the user the opportunity to adjust the tightness of fit of a joint. The lower that pin 20 is positioned on the side walls of the slot, the larger will be the tenon cut. At the same time, a relatively smaller mortise will also be cut. Slot 47 and pin 20 are dimensioned such that pin 20 will bottom in slot 47 by virtue of a tip narrower than slot 47 is wide to avoid the problem of pin 20 binding and catching in the slot.

FIG. 7 shows alternative means for adjusting interfit of complementary joint members. FIG. 7 is a detailed plan view of slot 47 which is formed with parallel sides 75. Pin 20 is modified to have a lower elliptical cross-section 77 insertable into slot 47. In addition, pin 20 is mounted to its guide arm for rotatable movement. In a first position, the long axis of the elliptical cross-section 77 extends at right angles to the longitudinal axis of slot 47 for a flush fit in the slot. This first position results in the largest tenon and smallest mortise being formed. Pin 20 is also rotatable through ninety degrees to the second position shown by dash lines. In this second position, the user must ensure that pin 20 is kept engaged against the side walls of the slot 47. This second positioning of pin 20 will tend to create larger mortises and smaller tenons. Pin 20 can also be rotated to any intermediate position between the first and second positions to allow for a range of adjustment in the size of the tenons and mortises to be cut.

The apparatus of the present invention is used in the following manner when cutting mortises and tenons:

The selected template member 49 is fitted into region 48 of tool support surface 4 and centred on the line 56. Clips 69 are secured in place.

The tenon workpiece to be cut is marked on its end with the desired centre of the finished tenon. The workpiece 9 is placed essentially vertically against workpiece support surface 6, centred left to right on guide line 55, and clamped in place. A simple swing over stop or insert (not shown) can be used to register the workpiece 9 for height. The projecting stop member 39 is brought against the workpiece and locked for all other similar work pieces.

Tool support surface 4 is centred on the tenon work piece front to rear using guide line 54 and locked in place. The router 10 is placed on the support surface with guide pin 20 engaging slot 47 and guide pin 22 engaged against the exterior surface of template member 49. Generally, a plunge router is employed.

Router 10 is plunged to the desired preset depth and the tenon is routed by moving pin 20 back and forth in slot 47 while pin 22 is moved about template member 49. In this manner, forming of a tenon can be accomplished in a single pass. Slot 47 and recess 48 is dimensioned such that pin 20 will reach either end of the slot to stop movement of the cutter before the cutter bit 24 has a chance to engage the tool support surface.

To form the complementary mortise, the mortise workpiece to be cut is marked on its side with the desired centre of the finished mortise. The mortise workpiece is then mounted substantially horizontally against the essentially vertical work face of support surface 6. The workpiece is centred or aligned as required using guide line 55, and the workpiece clamped into place. When mortise and tenon stock is of the same thickness, it is not necessary to adjust the position of tool support surface 4 to ensure a joint having flush workpiece side faces. However, the tool support surface 4 must be adjusted and centred as necessary for mortise stock that differs in thickness from the tenon stock.

The router 10 is mounted on the tool support surface 4 with guide pin 20 in slot 47 and guide pin 22 engaged within the interior of template member 49. The cutter is plunged into the workpiece and routed back and forth to form the mortise. Normal routing techniques will call for stepped plunging and routing for clean cuts.

It is apparent that the pins 20 and 22 do not have to be perfectly in line with the cutter or equidistant from it, but this is the preferred embodiment.

The jig design provides that when the two work pieces are raised against their respective height stops, the tenon work piece will be slightly lower than the mortise. This will ensure that the tenon is always slightly shorter than the mortise depth in blind mortises without adjustment of cutter height.

Although the present invention has been described in some detail by way of example for purposes of clarity and understanding, it will be apparent that certain changes and modifications may be practised within the scope of the appended claims.

I claim:

1. A jig for guiding a power tool in combination with a power tool having a cutter bit to cut joint members in workpieces, comprising:
    a base frame having a tool support surface and a workpiece support surface;
    a pair of guide members releasably attachable to said power tool;
    track means formed on said tool support surface adapted to slidably receive one of said guide members;
    template means releasably securable to said tool support surface having guide surface engagable by the other of said guide members, said track means and said template means cooperating to guide movement of said power tool atop said tool support surface; and
    clamping means for securing workpieces to the workpiece support surface in a position to allow cutting of a first joint member in one workpiece and a complementary joint member in another workpiece by said power tool.

2. A jig as claimed in claim 1 in which said template means comprises a member having an external guide surface shaped for cutting a tenon.

3. A jig as claimed in claim 2 in which said template means includes an internal guide surface shaped for cutting a complementary mortise.

4. A jig as claimed in claim 1 in which said tool support surface is movably mounted to said workpiece support surface.

5. A jig as claimed in claim 1 in which said tool support surface is movable with respect to said workpiece support surface and includes adjustable stops to limit the movement of said tool support surface with respect to said workpiece support surface.

6. A jig as claimed in claim 1 in which said guide members comprise arms attachable to said power tool to extend from opposite sides of said tool, said arms being fitted with depending pins.

7. A jig as claimed in claim 6 in which said guide arms extend from an auxiliary base attachable to said power tool.

8. A jig as claimed in claim 6 in which said guide arms are independent members attachable directly to said power tool.

9. A jig as claimed in claim 8 including a guide arm aligning template to orient said guide members when attached to said power tool.

10. A jig as claimed in claim 1 including means for adjusting the interfit of complementary joint members.

11. A jig as claimed in claim 10 in which said means for adjusting the interfit of complementary joint members comprises:
    a pin extending from said guide member and engagable in said track means, said pin being formed with a lower elliptical cross-section having a major axis and a minor axis and being mounted for rotatable movement between a first position in which said minor axis is parallel to said track means and a second position in which said major axis is parallel to said track means whereby selecting a rotated position of said elliptical pin and tracing said pin about said track means cuts joint members in a workpiece of a certain size and adjusting the rotated position of said pin allows variation in the size of joint members to be cut.

12. A jig as claimed in claim 10 in which said means for adjusting the interfit of complementary joint members comprises:
    bevelled side walls formed in said track means;
    bevelled sides form at the tip of a depending pin engagable in said track means; and
    means for adjusting the vertical position of said depending pin whereby selecting a vertical position of said pin on said bevelled side walls of said track means and tracing said pin about said track means at a constant level cuts joint members in a workpiece of a certain size and adjusting the vertical position of said pin allows variation in the size of joint members to be cut.

13. A jig as claimed in claim 12 in which said means for adjusting the vertical position of said depending pin comprises a threaded pin body received in a correspondingly threaded aperture is said guide arm.

14. A jig as claimed in claim 1 in which said workpiece support surface and said tool support surfaces have alignable cut out portions through which said power tool cutter bit extends for access to said workpieces.

15. A jig as claimed in claim 1 in which said workpiece support surface is provided with a projecting positioning member engagable with an edge of a workpiece for alignment of said workpiece.

16. A jig as claimed in claim 15 in which said projecting positioning member is pivotable to allow for angled positioning of said workpiece.

17. A jig as claimed in claim 1 in which said tool support surface is formed with an inset region to accept said template means such that said tool support surface presents a level surface over which said power tool is free to move.

18. A jig as claimed in claim 1 in which said template means comprises an essentially ellipsoid member having parallel, straight side edges interconnecting a pair of rounded end portions to define a template having a shape to guide the movement of said tool to cut a radiused tenon in a workpiece.

19. A jig as claimed in claim 1 in which said template means comprises an essentially rectangular member to define a template having a shape to guide the movement of said tool to cut a rectangular tenon in a workpiece.

20. A jig as claimed in claim 18 in which said essentially ellipsoid member is of modular construction and comprises two rounded end pieces joined by one or more intermediate aligned central pieces having parallel side edges, said end pieces defining the rounded ends of said tenon to be cut and said one or more central pieces defining the length of the straight sides of said tenon to be cut, said end pieces and said one or more central pieces being releasably interconnectable to allow cutting of a tenon of desired dimensions.

21. A jig as claimed in claim 1 which said template means is formed with a track to accept one of said guide members to guide movement of said tool to cut a mortise in a workpiece.

22. A jig as claimed in claim 1 in which said template means comprises a plurality of interconnectable portions that are assembled together to define a guide template.

23. A jig as claimed in claim 1 in which said track means and said template means are aligned along an axis extending longitudinally of said tool support surface.

24. A jig as claimed in claim 1 in which said workpiece support surface is pivotally mounted to said base frame and is releasably lockable at an angle with respect to said tool support surface to allow for cutting of angled joint members.

* * * * *